United States Patent
Sivakumar et al.

(10) Patent No.: US 11,941,445 B2
(45) Date of Patent: Mar. 26, 2024

(54) RLC CHANNEL MANAGEMENT FOR LOW MEMORY 5G DEVICES

(71) Applicant: International Business Machines Corporation, Armonk, NY (US)

(72) Inventors: Gandhi Sivakumar, Bentleigh (AU); Kushal S. Patel, Pune (IN); Luke Peter Macura, Lucas (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 17/472,743

(22) Filed: Sep. 13, 2021

(65) Prior Publication Data

US 2023/0081905 A1    Mar. 16, 2023

(51) Int. Cl.
    *G06F 9/50* (2006.01)
    *H04W 28/16* (2009.01)
    *H04W 88/02* (2009.01)

(52) U.S. Cl.
    CPC .......... *G06F 9/5016* (2013.01); *H04W 28/16* (2013.01); *H04W 88/02* (2013.01)

(58) Field of Classification Search
    None
    See application file for complete search history.

(56) References Cited

U.S. PATENT DOCUMENTS

| 8,687,576 | B2 | 4/2014 | Braennstroem |
| 8,964,560 | B2 | 2/2015 | Schneider |
| 9,408,109 | B2 | 8/2016 | Jonsson |
| 10,735,891 | B1 | 8/2020 | Trim |
| 2010/0306390 | A1 | 12/2010 | Haywood |
| 2012/0039176 | A1 | 2/2012 | Eshan |

(Continued)

FOREIGN PATENT DOCUMENTS

| CN | 110572850 A | 12/2019 |
| WO | 2015131119 A1 | 9/2015 |
| WO | 2023036617 A1 | 3/2023 |

OTHER PUBLICATIONS

"5G NR User Plane Protocol, What's new Over LTE in 5G NR", Techplayon, Nanocell, Sep. 6, 2017, Downloaded from the Internet on May 13, 2021, 12 pgs., <http://www.techplayon.com/5g-nr-radio-protocol-user-plane-whats-new-lte-5g-nr/.

(Continued)

*Primary Examiner* — Craig C Dorais
(74) *Attorney, Agent, or Firm* — Michael A. Petrocelli

(57) ABSTRACT

In an approach to RLC channel management for low memory 5G devices, responsive to detecting a memory overload in an RLC layer of a 5G user equipment, whether slices of a plurality of slices are merger candidates is determined. Responsive to determining that the slices are merger candidates, whether any merger candidates can share a transportation logical entity is determined, where merger candidates can share the transportation logical entity if performance and quality parameters are within predetermined limits. The merger candidates that can share the (Continued)

transportation logical entity are marked as allowed candidates. Responsive to determining that at least one allowed candidate has a workload that is below a predetermined threshold, the allowed candidates are merged into merged flows.

20 Claims, 10 Drawing Sheets

(56) References Cited

U.S. PATENT DOCUMENTS

| | | | | |
|---|---|---|---|---|
| 2014/0052874 | A1* | 2/2014 | Hu | G06F 5/14 |
| | | | | 709/234 |
| 2015/0235240 | A1 | 8/2015 | Chang | |
| 2018/0124639 | A1* | 5/2018 | Bathwal | H04L 69/04 |

OTHER PUBLICATIONS

"How Will 5G Impact on Memory?", Samsung, Jun. 18, 2019, 3 pgs., Samsung Semiconductor Global Website, © 1995-2021 Samsung, <https://www.samsung.com/semiconductor/newsroom/tech-trends/why-enhancing-memory-is-key-to-unlocking-the-5g-future/>.

"LTE eNB Architecture", LTE Tutorials, Artiza Networks, Downloaded from the Internet on May 13, 2021, 5 pgs., © 2001-2021 Artiza Networks, Inc., <https://www.artizanetworks.com/resources/tutorials/arc.html>.

"Optimizing Network Applications for 5G", Ericsson.com, Apr. 21, 2017, Downloaded from the Internet on May 13, 2021, 3 pgs., <https://www.ericsson.com/en/news/2017/4/optimizing-network-applications-for-5g>.

Chabbouh, "Novel Cloud-RRH Architecture With Radio Resource Management and QoS Strategies for 5G HetNets", IEEE Access, vol. 8, 18 pgs., Sep. 4, 2020, doi: 10.1109/ACCESS.2020.3021948.

Costa-Requena, "SDN-based UPF for Mobile Backhaul Network Slicing", 2018 European Conference on Networks and Communications (EuCNC), 2018, 6 pgs., IEEE Xplore, doi: 10.1109/EuCNC.2018.8442795.

Hilson, "More Memory Required for 5G to Compute", EET India, Apr. 3, 2019, Downloaded from the Internet on May 13, 2021, 4 pgs., <https://www.eetindia.co.in/more-memory-required-for-5g-to-compute/>.

India, "Memory is at the Heart of the Coming 5G Revolution", IT News, ET CIO, From The Economic Times, Aug. 11, 2020, Downloaded from the Internet on May 13, 2021, 12 pgs., <https://cio.economictimes.indiatimes.com/news/next-gen-technologies/memory-is-at-the-heart-of-the-coming-5g-revolution/77475785>.

International Search Report and Written Opinion for International Application No. PCT/EP2022/073605, International Filing Date: Aug. 24, 2022, dated Nov. 10, 2022, 13 pages.

* cited by examiner

RLC CHANNEL MANAGEMENT FOR LOW MEMORY 5G DEVICES

BACKGROUND

The present invention relates generally to the field of wireless communication networks, and more particularly to radio link control (RLC) channel management for low memory fifth generation (5G) telecommunications (telecom) devices.

In telecommunications, 5G is the fifth-generation technology standard for broadband cellular networks. 5G enables a new kind of network that is designed to connect virtually everyone and everything together including machines, objects, and devices. 5G wireless technology is meant to deliver higher multi-Gbps peak data speeds, ultra-low latency, greater reliability, massive network capacity, increased availability, and a more uniform user experience to more users. Higher performance and improved efficiency empower new user experiences and connects new industries. 5G is much more than the next generation of wireless networks. 5G is the connectivity fabric that will weave everything and everyone together.

5G is a significant evolution of 4G Long Term Evolution (LTE) networks. 5G has been designed to meet the very large growth in data and connectivity not only of User Equipment (UE) such as smart phones, but also the internet of things (IoT) with billions of connected devices, and new technologies such as driverless cars. 5G will initially operate in conjunction with existing 4G networks before evolving to fully standalone networks in subsequent releases and coverage expansions.

SUMMARY

Embodiments of the present invention disclose a method, a computer program product, and a system for RLC channel management for low memory 5G devices. In one embodiment, responsive to detecting a memory overload in an RLC layer of a 5G user equipment, whether one or more slices of a plurality of slices are one or more merger candidates is determined. Whether any merger candidates can share a transportation logical entity is determined, where merger candidates can share the transportation logical entity if performance and quality parameters are within predetermined limits. The one or more merger candidates that can share the transportation logical entity are marked as one or more allowed candidates. Responsive to determining that at least one allowed candidate of the one or more allowed candidates have a workload that is below a predetermined threshold, one or more allowed candidates are merged into one or more merged flows.

DETAILED DESCRIPTION

Figure 1:
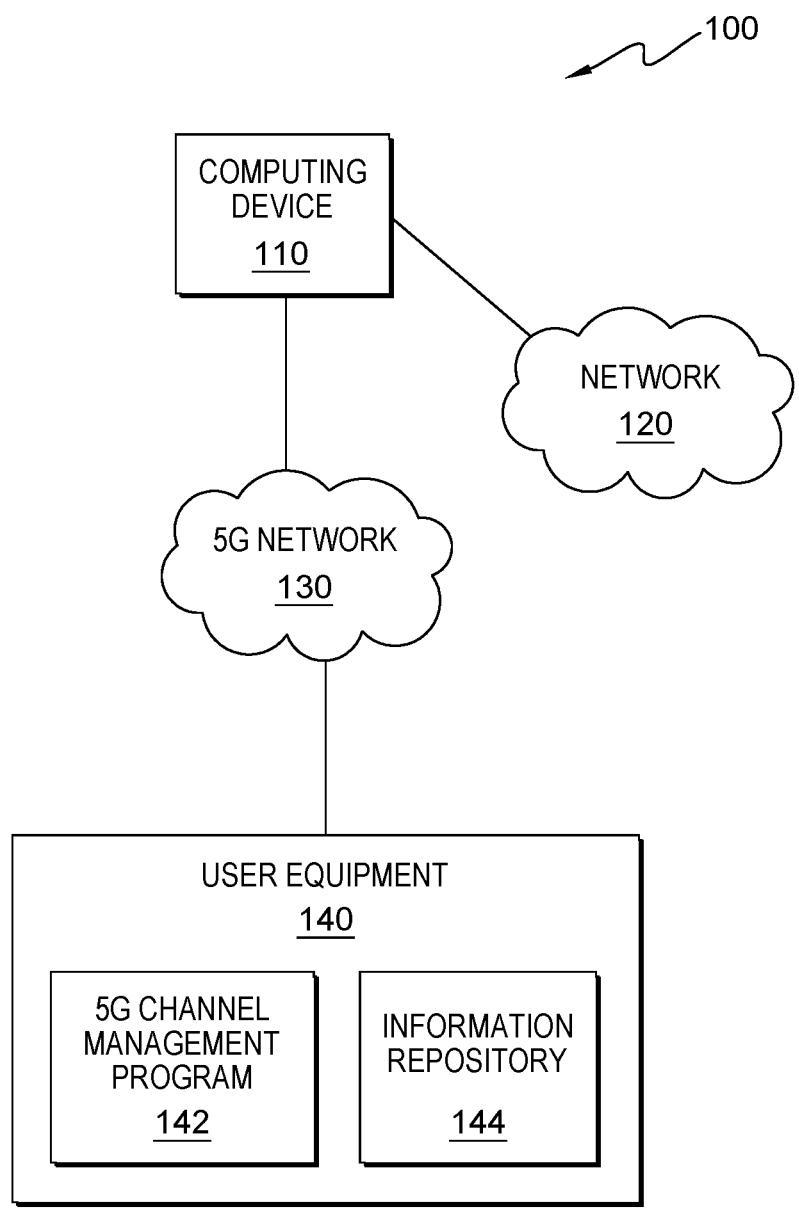
FIG. 1 is a functional block diagram illustrating a distributed data processing environment, in accordance with an embodiment of the present invention.

Advancements in the telecommunications industry have been a key enabler for many technologies including Artificial Intelligence (AI) to succeed by breaking the barrier of various factors like sedentary operations, lower bandwidth, etc. 5G technology is expected to serve as a rich enabler to push the dependent technologies to an even greater level through mobile bandwidth of 1 GBPS, convergence of IoT device access, etc. The 5G network is expected to become a part of the human community through various features including observing the surroundings, reasoning, inferring, and making decisions like humans.

In a 5G telecom network, the MAC layer of the New Radio (NR) provides services to the RLC layer controls in the form of logical channels. These logical channels are virtualized communication network interfaces that are used to transfer input/output (I/O) commands (network data packets) and control instructions over the radio interface and the 5G fixed access network. A logical channel is defined by the type of information it carries and is generally differentiated as a control channel, used for transmission of control and configuration information, or as a traffic channel used for user data. 5G new radio technology allows the creation of multiple logical channels over a single radio bearer network using the 5G network slicing models. These channels are used to carry specialized traffic from UE devices to the 5G network. As multiple channels are created from a single device to the 5G network, the channels deliver parallelism in the packet transmission as well as reduce the exclusive locking of the 5G network resources to realize performance benefits.

Smarter mobile applications are gaining the performance benefits of 5G logical channel-based parallelism with the creation of multiple Dedicated Traffic Channels (DTCH) from the UE to the 5G network. As the logical channels are created over the radio interface, the E-UTRAN Node B (eNodeB) is the hardware in the cell that is responsible for management of these DTCH over the radio interface. In the eNodeB, the resources are allocated to the DTCH based on its nature (S1, radio etc.), and parameters are negotiated at the time of channel creation. The eNodeB manages the logical channel over the NR and connects with the Serving Gateway (S-GW) of the 5G telecom network, and transmits the packets collected from all the channels using compression, alignment and multiplexing techniques. The data sending and reception in a bearer channel are transported by an S1 bearer between an S-GW and an eNodeB, and by a radio bearer between a UE and an eNodeB.

5G is more memory hungry compared to previous generations of mobile networks. Current mobile networks are just as much about transmitting 4K video as they are talk and text. Connected devices not only include smartphones, but sensors, parking meters, smart cars, wearables, and utilities. Telecom infrastructure is now networking and compute infrastructure, flash, DRAM and emerging memories are supplanting SRAM and TCAM. The spread of compute needs across the spectrum from core to edge is driving heterogeneity in terms of the requirements of the memory attached to all the various compute elements.

Theoretically, a 5G telecom network can support many logical channels that can be created between a UE and an eNodeB. When a channel creation is initiated at the first logical endpoint in the 5G network, the required resources are allocated to it so that the packets on that RLC channel can be processed at high speed. Additionally, these logical RLC tunnels provide the capability of handling dissimilar traffic coming from each application or set of applications and help the network slicing mode to define the priorities of the incoming traffic. Accordingly, it can prioritize over various internal network components. This leads to the creation of multiple RLC tunnels between the UE and the eNodeB entries. These tunnels are then used for parallel packet transmission flow by individual MAC connectors and multiplexers for packet transmission over the Radio Access Network (RAN) interface. In this case, as multiple logical channels are created at the UE, each channel has its own resource demand at each logical endpoint. This resource demand includes memory and compute requirements at each end to process the workload effectively. When any RLC tunnel is being created at the UE, a set of memory pages will be allocated to it. These are contiguous memory blocks having DMA capability at the physical layer, and therefore the pages need to be physically contiguous at the memory address location. Since the amount of contiguous memory is limited in the UE and other endpoint devices, swap partitions are used to swap the channels across the interfaces. In case of low memory devices that need to be enabled for 5G networks, this is one of the common problems where the least used or low workload channels are being frequently migrated to swap partitions to allocate the local memory space for the active channels. This allows for operating more channels while working with lower memory devices on 5G network.

In the case of certain RLC channels that have less traffic, it is easier to choose the channel that needs to be moved to the swap partition for a new set of RLC slices which are accessing the workload. However, in the case where there are more channels, each submitting a small amount of workload all the time over lower layers like the MAC, it becomes difficult to choose channels as swap candidates. As the RLC channel is moved to the swap space, all the packets common to this channel need to be quiesced until it is swapped back to the main memory of the node. In this case, since small I/O packet workflow is being performed by the channels, the workflow may be too low to trigger a move from swap to main memory. This creates performance issues in the UP stack of the 5G RLC layer. The applications accessing different channels, performing lower workload than the full bandwidth cannot share physically contiguous pages as they are exclusively allocated to each RLC tunnel for packet transmission. Additionally, even if each slice is less loaded, some of the channels need to be moved for the swap partition home and this introduces packet delay for the applications accessing those RLC channels. All the I/O packets from those channels are marked on hold until the channel is resumed, i.e., when the channel has been returned to main memory from swap. Because of this, the performance of the system degrades drastically even if the CPU, memory and storage resources are not occupied. This creates thrashing of the channels at logical endpoints. For simplicity, consider this is a UE device, but this situation can happen at any component, such as the eNodeB or S-GW, because of inappropriate resource consumption at the RLC of the 5G UP stack.

The present invention provides a method, computer program product, and system that works with 5G enabled logical endpoint devices and provides a mechanism to alleviate frequent swapping of the RLC channels in the swap partition in case the selected candidates and other related candidates are not using the allocated pages. The present invention provides a way by which the RLC channel swapping manager detects the overall workload on certain types of logical channels in the RLC protocol layer, and accordingly decides to merge or unmerge the logical channels instead of swapping them across memory locations. The workload manager in the 5G UP RLC protocol stack has a monitoring daemon that collects information regarding current workload from all the logical channels that are detected active. When the system detects that some of the slices need to be moved to the swap disk partition, the QCI and bandwidth characteristics of the channel are determined by an examination daemon and the channels that are less active are selected for merging (if their respective policies allow for merger). The information from upper layers like the SDAP is pre-gathered to get the nature of the logical channels security provisioning which is catalogued based on their merging and security needs.

If the channels can share a transportation logical entity, then they are marked for merge provisioning. Channels can share a transportation logical entity, i.e., can be merged, if the channels are less loaded, and parameters including, but not limited to, the packet delay budget, Guaranteed Bit Rate (GBR)/Non-Guaranteed Bit Rate (Non-GBR) compliance and QCI values are in a permissible range. In case memory resources overallocation is detected, the swapping trigger is generated by the resource manager in the device. Based on reception of the signal, the information for the merger channels is inquired from pre-computed handshake information at the RLC. Once the changes are selected, the workload examiner will be invoked to make the dynamic merging decisions based on determining which channels from the merger list have lower workload. In case there are multiple channels detected that have less than a defined limit, e.g., 30%, they can be combined, or merged, to gain performance benefits. When the candidates are selected, their identities will be transferred to the merging unit that transparently handles packet flow routing for the upper layer I/O workload. The RLC controller receives the logical UUIDs of the RLC tunnels that need to be merged, creates a local table for the merge mapper data structures and selects the channels.

While making the final merger decision, the QCI co-categories and packet transmission delay tolerance are considered and validated between the candidates since this directly effects the transmission over the MAC and RLC interfaces. In case the QCI characteristics have differences, the channel with the better QCI will be selected as main and another tunnel will be marked as auxiliary. The multiplexer engine will keep track of main and auxiliary candidates for merging and then real time packet forwarding is triggered on an auxiliary tunnel.

When any new I/O transmission or reception interrupt is received by the RLC protocol from the MAC or the SDAP, the identities are mapped to the mergers and other usual transmission flows and forwarding layers are invoked. While formulating the RLC header in the packets, the SDAP identify is invoked and accordingly the RLC_ID is selected for packet embedding. If the packet is being received for the auxiliary channel, the RLC_ID of the main will be overridden while framing the RLC header for the uplink packets. In case the of downlink flow, the exact reverse approach is used wherein the extracted RLC_ID is mapped with the SDAP IDs and in case the RLC_ID is the ID of the main channel, then the selection of SDAP channel will be made to select upper layer submissions.

Since the auxiliary candidate's packet flow is being forwarded to another RLC_ID in a transparent way, the original memory pages can be moved to the swap partition for a longer period of time without quiescing the application workload. If the merger main experiences bandwidth overloading, then the original policies will be resumed to get optimal performance of the applications accessing these RLC transmissions entities. Additionally, as the resources are used in an optimal way, this further helps to add more application tunnels from the SDAP layer on low memory platforms and improves the low memory devices to run more applications with optimal page utilization in a 5G telecom network.

FIG. 1 is a functional block diagram illustrating a distributed data processing environment, generally designated 100, suitable for operation of 5G channel management program 142 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and UE 140, which are connected to 5G network 130. Computing device 110 is also connected to core network 120. Core network 120 can be, for example, a telecommunications network, a local area network (LAN), a wide area network (WAN), such as the Internet, or a combination of the three, and can include wired, wireless, or fiber optic connections. Core network 120 can include one or more wired and/or wireless networks that are capable of receiving and transmitting data, voice, and/or video signals, including multimedia signals that include voice, data, and video information. In general, core network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a base station for a cellular communication network, including an eNodeB base station for a 5G telecommunications network. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via core network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

UE 140 can be a smart phone, standalone computing device, a computer device incorporated into a vehicle, a mobile computing device, or any other electronic device or computing system capable of receiving, sending, and processing data. In an embodiment, UE 140 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via 5G network 130.

In an embodiment, UE 140 includes 5G channel management program 142. In an embodiment, 5G channel management program 142 is a program, application, or subprogram of a larger program for RLC channel management for low memory 5G devices. In an alternative embodiment, 5G channel management program 142 may be located on any other device accessible by UE 140 via 5G network 130.

In an embodiment, UE 140 includes information repository 144. In an embodiment, information repository 144 may be managed by 5G channel management program 142. In an alternate embodiment, information repository 144 may be managed by the operating system of UE 140 alone, or together with, 5G channel management program 142. Information repository 144 is a data repository that can store, gather, compare, and/or combine information. In some embodiments, information repository 144 is located externally to UE 140, and is accessed through a communication network, such as 5G network 130. In some embodiments, information repository 144 is stored on UE 140. In some embodiments, information repository 144 may reside on another computing device (not shown), provided that information repository 144 is accessible by UE 140. Information repository 144 may include 5G system configuration data, UE data, UP data, channel data, merger data, other data that is received by 5G channel management program 142 from one or more sources, and data that is created by 5G channel management program 142.

Information repository 144 may be implemented using any volatile or non-volatile storage media for storing information, as known in the art. For example, Information repository 144 may be implemented with a tape library, optical library, one or more independent hard disk drives, multiple hard disk drives in a redundant array of independent disks (RAID), SATA drives, solid-state drives (SSD), or random-access memory (RAM). Similarly, Information repository 144 may be implemented with any suitable storage architecture known in the art, such as a relational database, an object-oriented database, or one or more tables.

Figure 2:
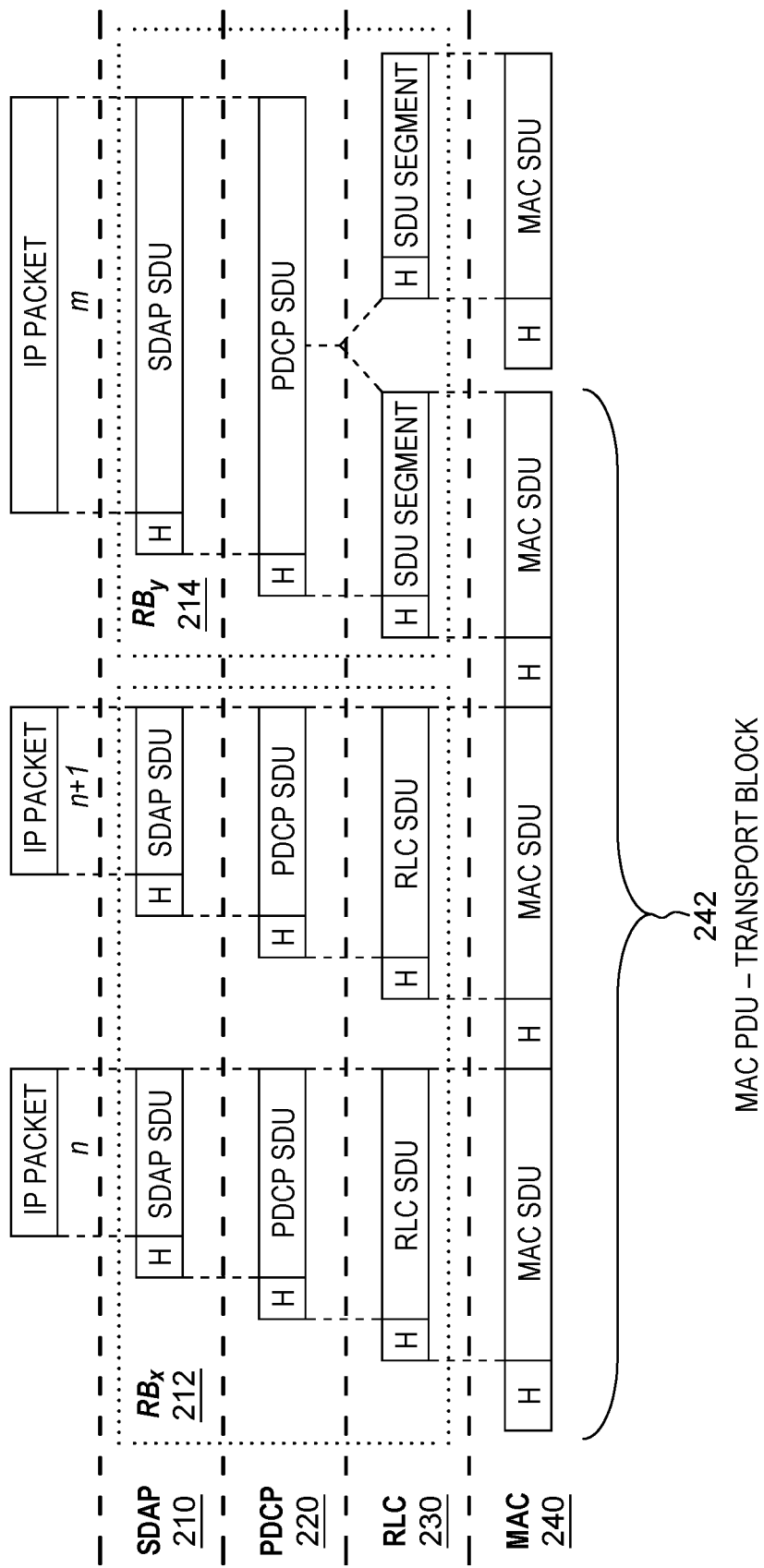
FIG. 2 is an example illustration of 5G User Plane (UP) packet encoding-decoding, in accordance with an embodiment of the present invention.

FIG. 2 is an example illustration of a 5G User Plane (UP) packet encoding-decoding, in accordance with an embodiment of the present invention. The example of FIG. 2 includes SDAP 210. The SDAP sublayer exists only in the user plane in both the eNodeB and the UE, e.g., UE 140 from FIG. 1. The eNodeB interfaces to upper layers via Quality of Service (QoS) flows and to the Packet Data Convergence Protocol (PDCP) lower layer via Data Radio Bearers (DRBs). Traffic from QoS flows are mapped to suitable DRBs. This is an essential role of the SDAP.

FIG. 2 also includes radio bearers $RB_x$ 212 and $RB_y$ 214. Radio bearers are similar to logical channels for user control data.

PDCP 220 is a layer of the NR protocol stack. It is placed above the RLC and below the SDAP in the Radio Protocol Stack in the 5G NR. PDCP 220 of FIG. 2 provides services to SDAP 210 including transfer of user plane data, transfer of control plane data, header compression, ciphering, and integrity protection.

FIG. 2 also includes RLC 230 and MAC 240. RLC 230 is a layer 2 Radio Link Protocol used on the air interface. RLC 230 is located above MAC 240 and below PDCP 220. MAC 240 is the layer that basically provides the radio resource allocation service and the data transfer service to the upper layers. A transport block for the Protocol Data Unit (PDU) typically consists of a header, MAC subheader, and a payload. An example of a MAC PDU is shown in FIG. 2 as MAC PDU 242.

Figure 3:
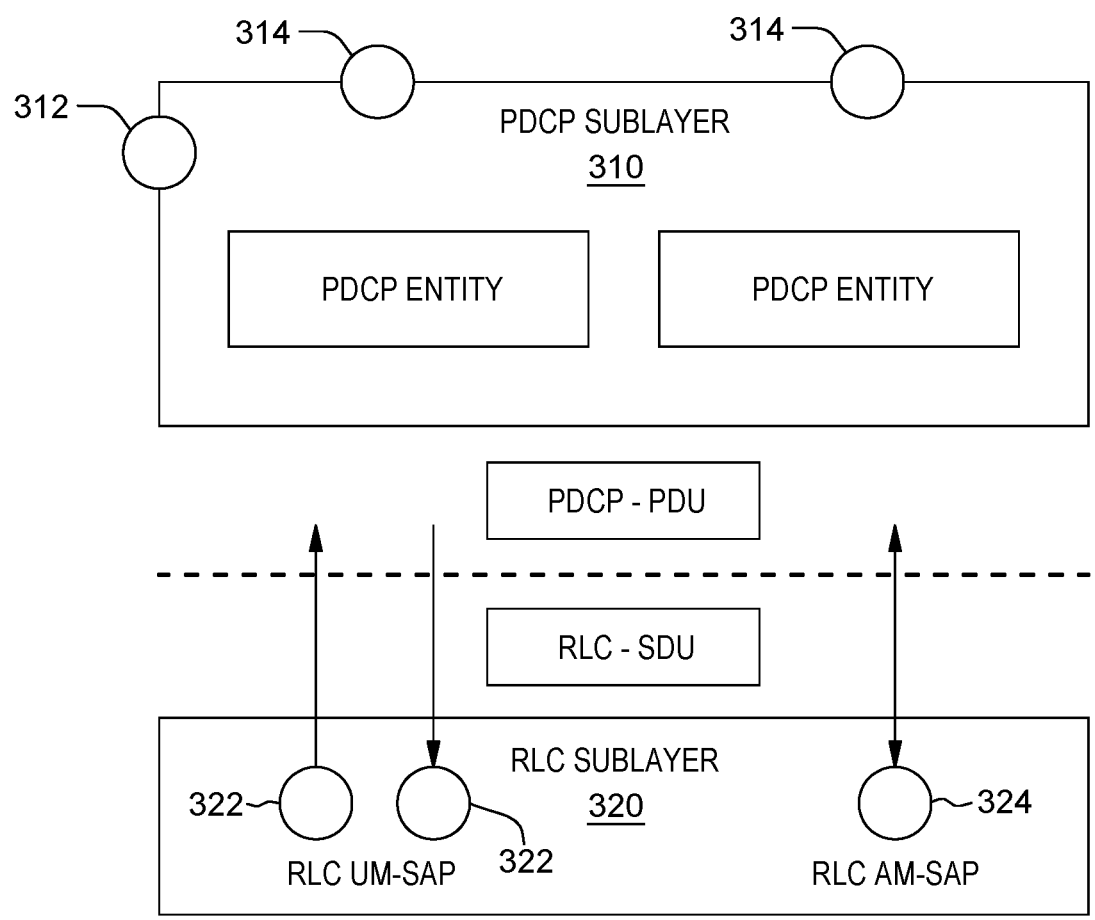
FIG. 3 is an example of a structural view of PDCP layer and RLC channels in the User Plane (UP), in accordance with an embodiment of the present invention.

FIG. 3 is an example of the structural view of the PDCP layer and the RLC channels in the User Plane (UP), in accordance with an embodiment of the present invention. In the example of FIG. 3, PDCP sublayer 310 is the part of the LTE layer 2 protocols that is responsible for the IP header compression of user-plane data packets in order to reduce the number of information bits transmitted over the air-interface and to improve transmission efficiency. PDCP sublayer 310 contains Control Service Access Point (C-SAP) 312, the logical connection (interface) between the PDCP and the SDAP, e.g., PDCP 220 and SDAP 210 from FIG. 2. PDCP sublayer 310 also contains PDCP Service Access Points (SAPs) 314, which are the interfaces between the SDAP and the PDCP.

RLC sublayer 320 is a layer 2 radio link protocol used in UMTS, LTE and 5G on the air interface, for example, RLC 230 from FIG. 2. RLC sublayer 320 is located above the MAC layer and below the PDCP layer, e.g., MAC 240 and PDCP 220 from FIG. 2. RLC sublayer 320 contains RLC Unacknowledged Mode (UM)-SAP channels 322 and RLC Acknowledged Mode (AM)-SAP channels 324, which are the logical connection (interface) between the RLC and the PDCP. In acknowledged mode, an ACK signal is passed between communication entities to confirm to another party that the message is received. In unacknowledged mode, the packets are assumed to be received once they are sent from the initiator and no ACK signal is expected.

Figure 4:
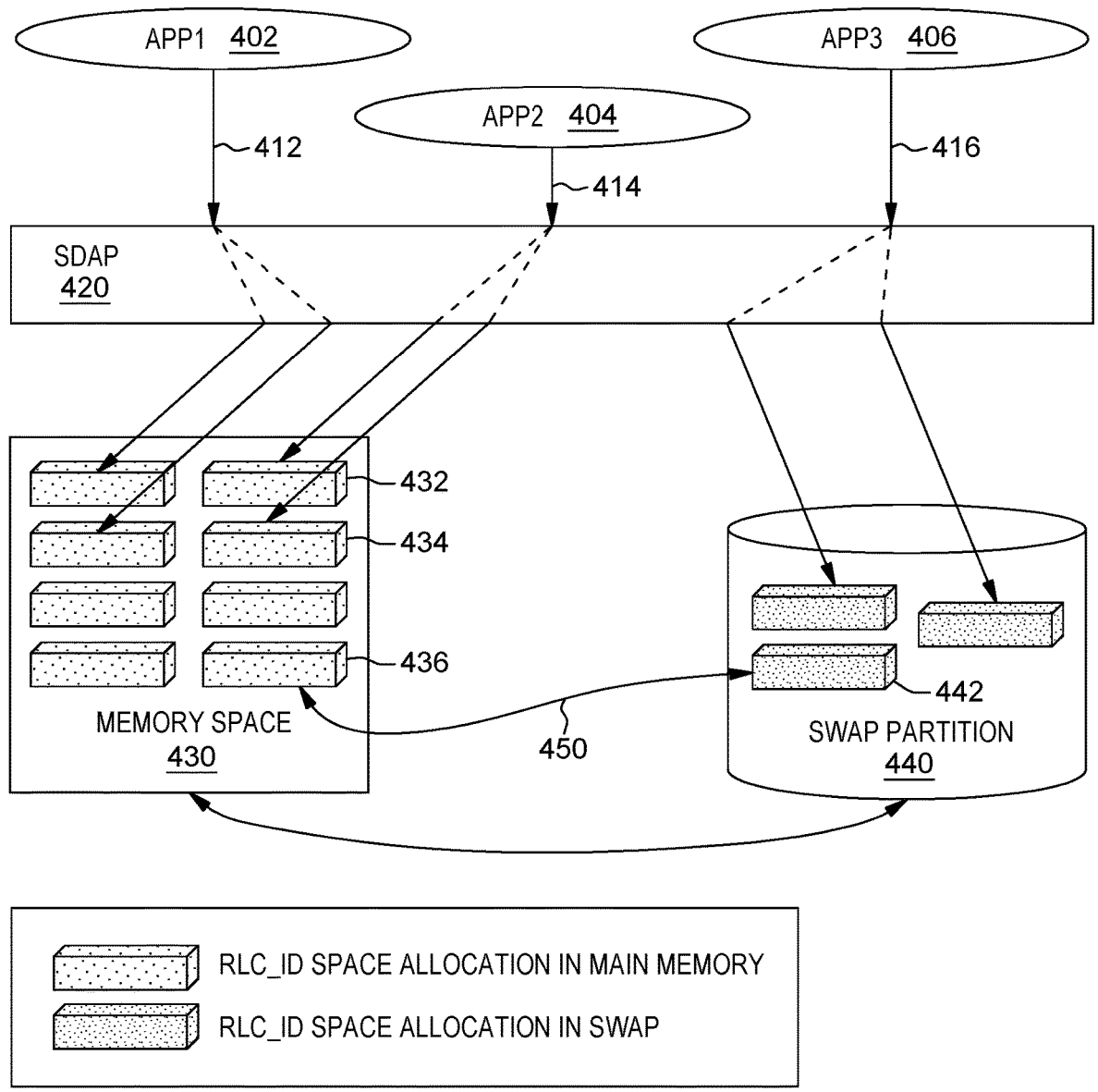
FIG. 4 illustrates an example of the memory swap management on the UE, in accordance with an embodiment of the present invention.

FIG. 4 illustrates an example of the memory swap management on the User Equipment (UE), in accordance with an embodiment of the present invention. In the example of FIG. 4, three applications, APP1 402, APP2 404, and APP3 406, are connected to SDAP 420 of the UE via Connections 412, 414, and 416 respectively. SDAP 420 is, for example, SDAP 210 from FIG. 2. The UE has memory configured as Memory Space 430, which is the main memory of the UE, and Swap Partition 440, a section of the main memory reserved for swapping data into and out of memory space 430.

Memory space 430 includes Memory Block 432, Memory Block 434, and Memory Block 436. Memory blocks 432 and 434 have been allocated to APP2 404. Packets from APP3 406, however, are on hold because the allocation for the RLC_ID of APP3 406 was moved to swap partition 440. As a result, APP3 406 experiences more latency because Swap Memory Block 442, which was allocated to APP3 406, must by swapped into Memory Block 436 in memory space 430 before the packets from APP3 406 can be processed. The actual swapping of swap memory block 442 to memory block 436 is illustrated by Swap Connection 450.

Figure 5:
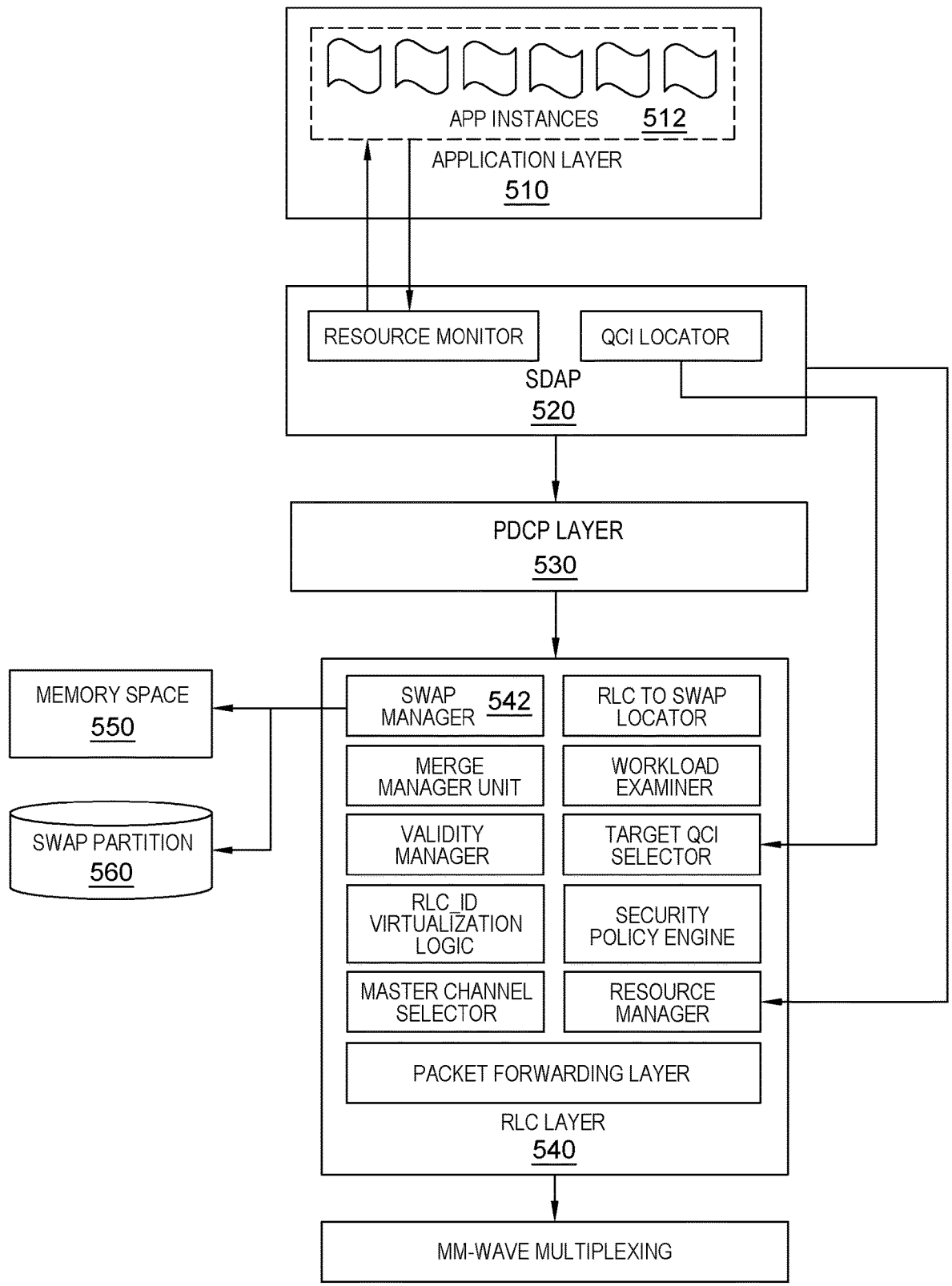
FIG. 5 is a block diagram of the system architecture for an embodiment of the 5G channel management program, in accordance with an embodiment of the present invention.

FIG. 5 is a block diagram of the system architecture for an embodiment of the 5G channel management program. The block diagram of FIG. 5 includes Application Layer 510, which includes App Instances 512. App instances 512 may be, for example, APP1 402, APP2 404, and APP3 404 from FIG. 4. App layer 510 connects to SDAP 520, which is, for example, SDAP 210 from FIG. 2, which in turn connects to PDCP Layer 530, which is, for example PDCP 220 from FIG. 2. RLC Layer 540, which is, for example, RLC 230 from FIG. 2, includes Swap Manager 542. Swap manager 542 handles the memory swapping between Memory Space 550 and Swap Partition 560. Memory space 550 and swap partition 560 are, for example, memory space 430 and swap partition 440, respectively, from FIG. 4.

Figure 6:
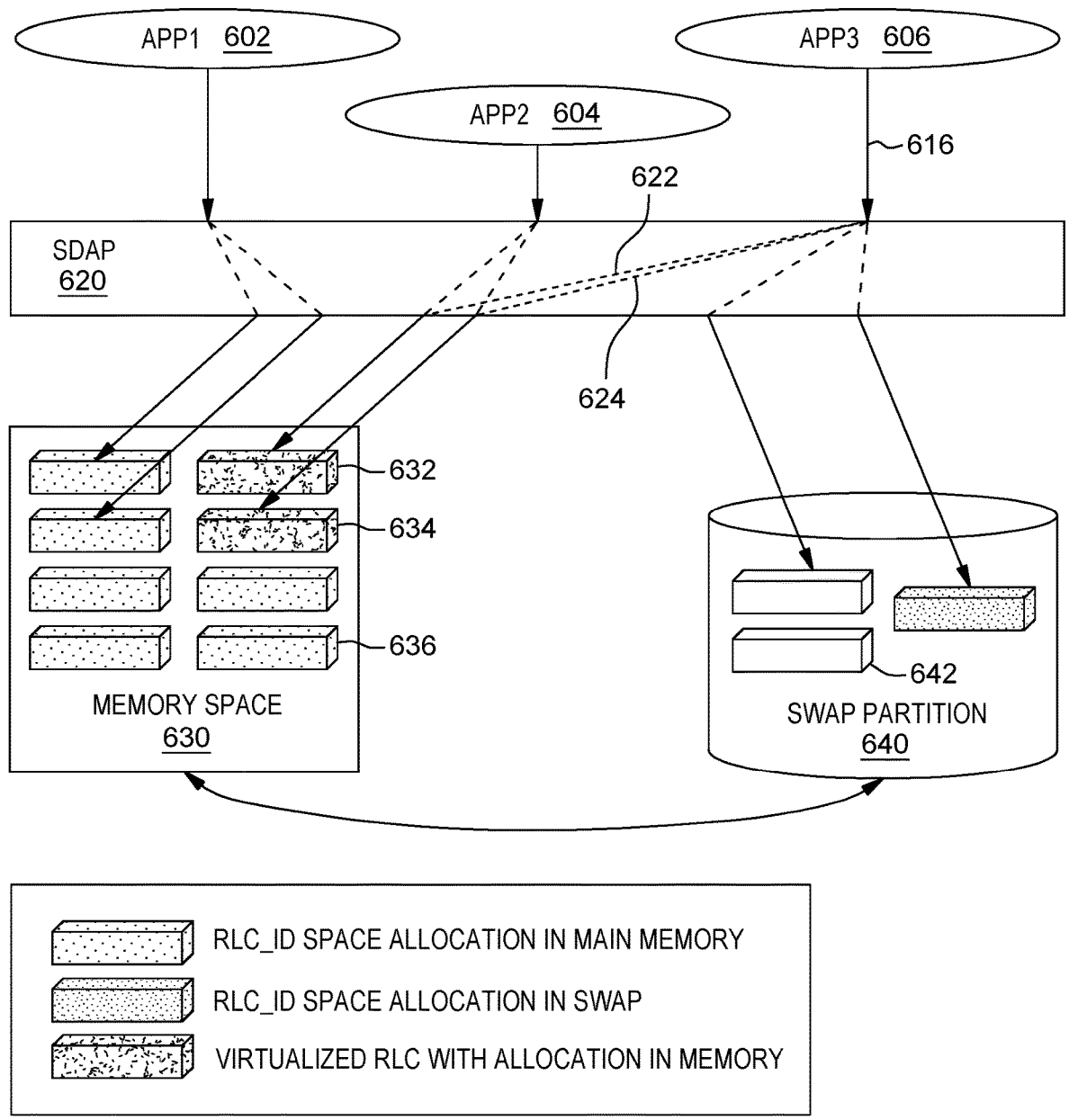
FIG. 6 is an example of a virtualized RLC for better traffic flow in low memory platforms on the UE, in accordance with an embodiment of the present invention.

FIG. 6 is an example of a virtualized RLC for better traffic flow in low memory platforms on the UE, e.g., user equipment 140 from FIG. 1, in accordance with an embodiment of the present invention. The example of FIG. 6 shows the same memory swap management of FIG. 4, but with the present invention included. In the example of FIG. 6, three applications, APP1 602, APP2 604, and APP3 606, are connected to SDAP 620 of the UE. SDAP 620 is SDAP 420 from FIG. 4. The UE has memory space 630 and swap partition 640, which are memory space 430 and swap partition 440, respectively, from FIG. 4. In this example, however, while APP3 406 from FIG. 4 was allocated memory in swap memory block 442 of swap partition 440, here instead of swapping memory blocks as in FIG. 4, the present invention has merged the 5G slices from APP3 606 with the slices from APP2 604, as shown by Virtualized RLC Connection 622 and Virtualized RLC Connection 624. Therefore, using the present invention, the packets from APP3 606 utilize memory blocks 632 and 634 in memory space 630, instead of memory block 642 in swap partition 640. Memory space 630 also includes Memory Block 636, which is memory block 436 from FIG. 4. This avoids the delay associated with swapping between main memory and the swap partition, and therefore improves overall performance.

Figure 7:
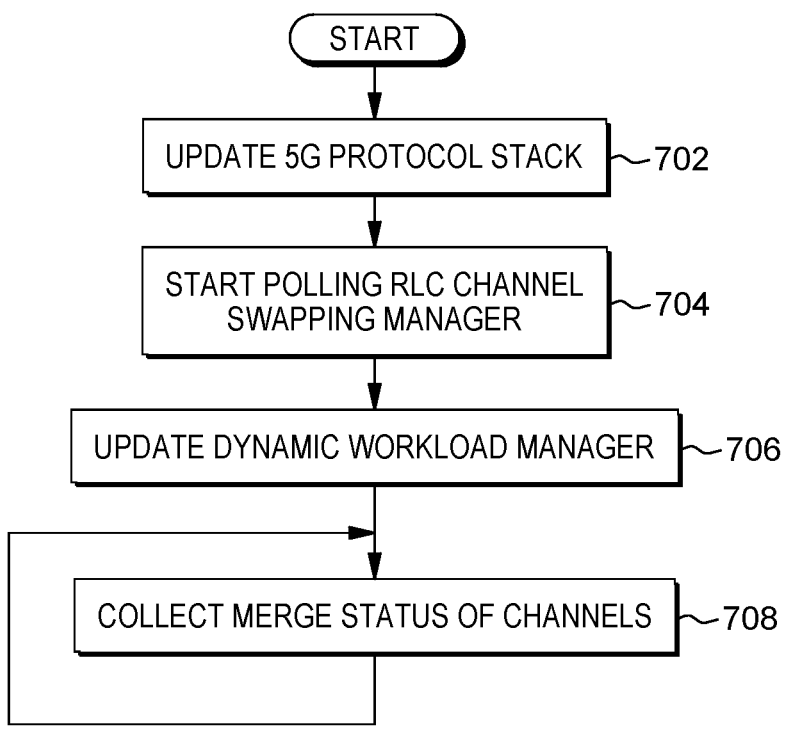
FIG. 7 is a flowchart depicting operational steps of the procedure performed by the 5G channel management program that handles the mapper classes and polling on a UE within the distributed data processing environment of FIG. 1, in accordance with an embodiment of the present invention.

FIG. 7 is a flowchart depicting operational steps of the procedure performed by the 5G channel management program that handles the mapper classes and polling on a UE within the distributed data processing environment of FIG. 1, in accordance with an embodiment of the present invention. In an alternative embodiment, the steps of workflow 700 may be performed by any other program while working with 5G channel management program 142.

In an embodiment, 5G channel management program 142 receives user plane 5G protocol stack updates for mapping classes and polling the connected channels. In an embodiment, 5G channel management program 142 starts polling for the overall workload on the channel. In an embodiment, 5G channel management program 142 updates the dynamic workload manager structure to accept pre-cooked data. In an embodiment, 5G channel management program 142 determines the status of the connected channels as either merged or unmerged.

It should be appreciated that embodiments of the present invention provide at least for operational steps of the procedure performed by the 5G channel management program that handles the mapper classes and polling on a UE within the distributed data processing environment of FIG. 1. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 7 is illustrates one possible iteration of the procedure performed by the 5G channel management program that handles the mapper classes and polling on a UE within the distributed data processing environment of FIG. 1, which runs continuously once 5G channel management program 142 has been initiated on the UE.

5G channel management program 142 updates the 5G protocol stack (step 702). In an embodiment, 5G channel management program 142 receives user plane 5G protocol stack updates for mapping classes and polling the connected channels. In an embodiment, 5G channel management program 142 loads local data structures for at least the mapping and polling.

5G channel management program 142 starts polling the RLC channel swapping manager (step 704). In an embodiment, 5G channel management program 142 starts polling for the overall workload on the channel.

5G channel management program updates the dynamic workload manager (step 706). In an embodiment, 5G channel management program 142 updates the dynamic workload manager structure to accept pre-cooked data. In an embodiment, pre-cooked data is data that has been processed in some form. In an embodiment, 5G channel management program 142 does this to check the workload for the channels, gather the allocated bandwidth for the logical channel, and decide whether the channel is less loaded, moderately loaded or highly loaded. In an embodiment, to get the information, 5G channel management program 142 monitors channel packet statistics to derive the information.

5G channel management program collects the merge status of channels (step 708). In an embodiment, 5G channel management program 142 determines the status of the connected channels as either merged or unmerged. In an embodiment, 5G channel management program 142 remains in step 708 to continuously update the merge status of the channels. In an embodiment, the merge status is updated on an interval determined by a state machine.

Figure 8:
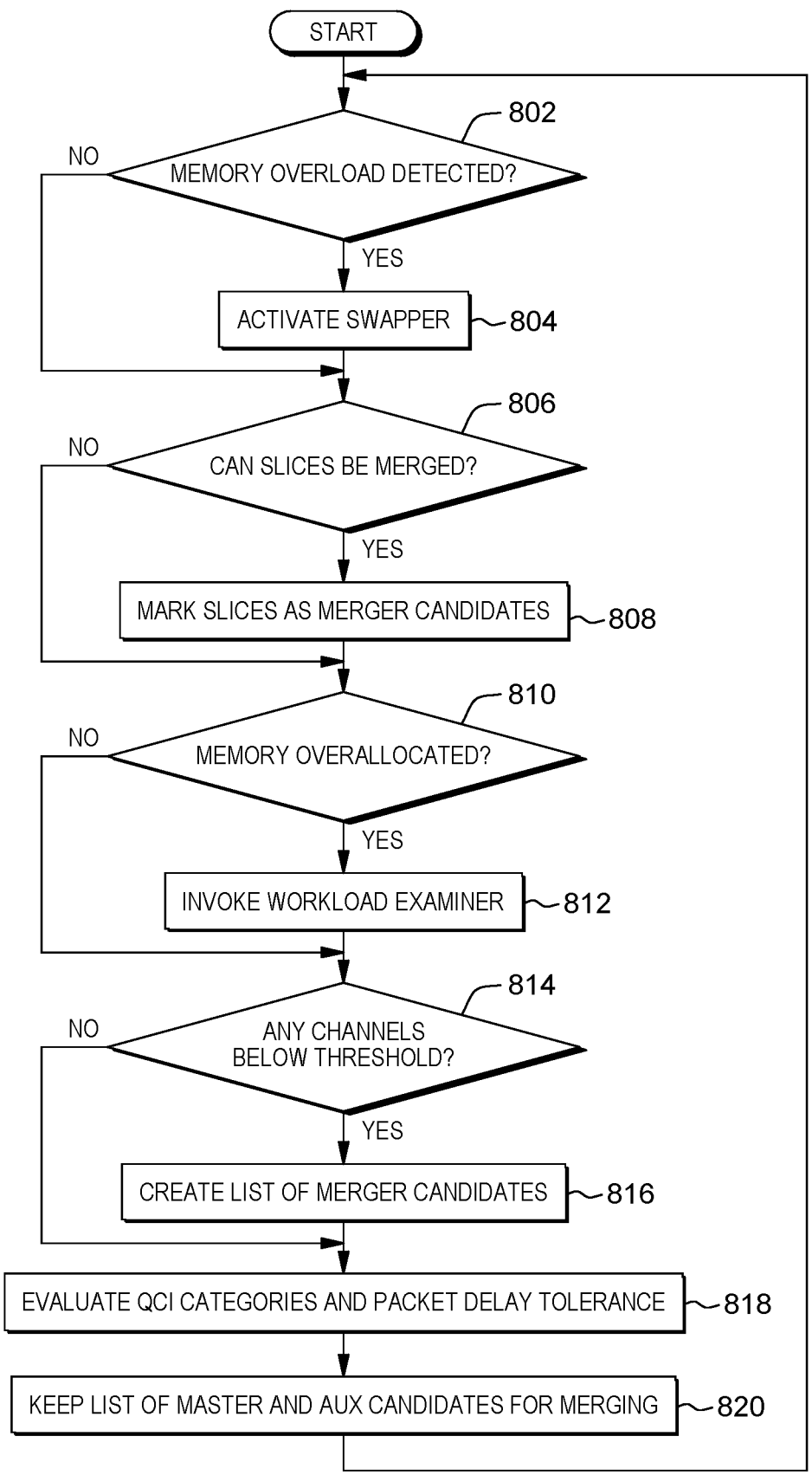
FIG. 8 is a flowchart depicting operational steps of the procedure performed by 5G channel management program 142 for dynamic merging management in the RLC on a UE within the distributed data processing environment of FIG. 1, in accordance with an embodiment of the present invention.

FIG. 8 is a flowchart depicting operational steps of the procedure performed by 5G channel management program 142 for dynamic merging management in the RLC on a UE within the distributed data processing environment of FIG. 1, in accordance with an embodiment of the present invention. In an alternative embodiment, the steps of workflow 800 may be performed by any other program while working with 5G channel management program 142.

In an embodiment, 5G channel management program 142 determines if a memory overload is detected. In an embodiment, if 5G channel management program 142 determines that the RLC allocated memory is overloaded, then some of the slices need to be moved to the swap partition, e.g., swap partition 440 of FIG. 4, so 5G channel management program 142 activates the swapper functions that were received in step 702 of FIG. 7 above. In an embodiment, 5G channel management program 142 uses an examination daemon to inquire the Quality of Service (QoS) Class Identifier (QCI) and bandwidth characteristics of the channel. In an embodiment, 5G channel management program 142 determines that merging is allowed if the policies set the allow merging parameter to true, e.g., ALLOW_MERGE==TRUE. In an embodiment, if 5G channel management program 142 determines in step 804 above that the slices are candidates to be merged, then 5G channel management program 142 determines if the slices can share a transportation logical entity. In an embodiment, if 5G channel management program 142 determines that the slices can be merged, then 5G channel management program 142 marks the slices as merger allowed. In an embodiment, 5G channel management program 142 determines if the memory resources are over-allocated for the RLC UP stack. In an embodiment, if 5G channel management program 142 determines that the memory resources are over-allocated for the RLC UP stack, then 5G channel management program 142 uses the resource manager, e.g., the resource manager in RLC layer 540 of FIG. 5 above, to generate a trigger message. In an embodiment, 5G channel management program 142 determines if any of the detected channels have workloads less than a threshold value. In an embodiment, if 5G channel management program 142 determines that any of the detected channels have workloads less than a threshold value, then 5G channel management program 142 transfers their identities to the merging unit that transparently handles packet flow routing for incoming I/O workloads. In an embodiment, 5G channel management program 142 validates the QCI co-categories and packet transmission delay tolerance for all the candidate RLC_IDs in the list of merger candidates. In an embodiment, 5G channel management program 142 uses a multiplexer engine to keep track of main and auxiliary candidates for merging and then real time packet forwarding is triggered on an auxiliary tunnel.

It should be appreciated that embodiments of the present invention provide at least for operational steps of the procedure performed by 5G channel management program 142 for dynamic merging management in the RLC on a UE within the distributed data processing environment of FIG. 1. However, FIG. 8 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 8 is illustrates one possible iteration of the procedure performed by 5G channel management program 142 for dynamic merging management in the RLC on a UE within the distributed data processing environment of FIG. 1, which runs continuously once 5G channel management program 142 has been initiated on the UE.

5G channel management program 142 determines if a memory overload is detected (decision block 802). In an embodiment, if 5G channel management program 142 determines that the RLC allocated memory is not overloaded ("no" branch, decision block 802), then 5G channel management program 142 proceeds to decision block 806. In an embodiment, if 5G channel management program 142 determines that the RLC allocated memory is overloaded ("yes" branch, decision block 802), then 5G channel management program 142 proceeds to step 804.

5G channel management program 142 activates the swapper (step 804). In an embodiment, if 5G channel management program 142 determines that the RLC allocated memory is overloaded, then some of the slices need to be moved to the swap partition, e.g., swap partition 440 of FIG. 4, so 5G channel management program 142 activates the swapper functions that were received in step 702 of FIG. 7 above.

In an embodiment, 5G channel management program 142 determines if the slice is a candidate for merger instead of swapping. In an embodiment, 5G channel management program 142 uses an examination daemon to inquire the QCI and bandwidth characteristics of the channel. In an embodiment, 5G channel management program 142 gathers activation times for the RLC channels. In an embodiment, 5G channel management program 142 uses a monitoring daemon to gather the workload on the channel. In an embodiment, 5G channel management program 142 selects the channels that are less active as candidates for merging if allowed by their respective policies.

In an embodiment, 5G channel management program 142 checks the system policies for the RLC_ID of the channel to determine if the policies allow for merging the channel. In an embodiment, 5G channel management program 142 determines that merging is allowed if the policies set the allow merging parameter to true, e.g., ALLOW_MERGE==TRUE. In an embodiment, if 5G channel management program 142 determines that the policies allow for merging the channel, then 5G channel management program 142 moves the channel to the merger candidate list. In an embodiment, 5G channel management program 142 gathers information from the SDAP using Platform Message Queue communication and the nature of security provisioning for the logical channels are selected. In an embodiment, 5G channel management program 142 makes merger decisions based on a catalog of security requirements.

5G channel management program 142 determines if slices can be merged (decision block 806). In an embodiment, if 5G channel management program 142 determines in step 804 above that the slices are candidates to be merged, then 5G channel management program 142 determines if the slices can share a transportation logical entity. In an embodiment, if 5G channel management program 142 determines that the slices can share a transportation logical entity, then the slices can be merged. In an embodiment, 5G channel management program 142 determines that the slices can share a transportation logical entity, i.e., can be merged, if the channels are less loaded, and parameters including, but not limited to, the packet delay budget, Guaranteed Bit Rate (GBR)/Non-Guaranteed Bit Rate (Non-GBR) compliance, and QCI values are in a permissible range. In an embodiment, the permissible range for the GBR/non-GBR compliance and QCI values are pre-determined. In another embodiment, the permissible range for the GBR/non-GBR compliance and QCI values are received by 5G channel management program 142.

In an embodiment, if 5G channel management program 142 determines that the slices cannot be merged ("no" branch, decision block 806), then 5G channel management program 142 proceeds to decision block 810. In an embodiment, if 5G channel management program 142 determines that the slices can be merged ("yes" branch, decision block 806), then 5G channel management program 142 proceeds to step 808.

5G channel management program 142 marks slices as merger candidates (step 808). In an embodiment, if 5G channel management program 142 determines that the slices can be merged, then 5G channel management program 142 marks the slices as merger allowed. In an embodiment, 5G channel management program 142 marks the slices as merger allowed by setting the parameter ALLOW_MERGE==TRUE.

5G channel management program 142 determines if the memory is overallocated (decision block 810). In an embodiment, 5G channel management program 142 determines if the memory resources are over-allocated for the RLC UP stack. In an embodiment, if 5G channel management program 142 determines that the memory resources are not over-allocated for the RLC UP stack ("no" branch, decision block 810), then 5G channel management program 142 proceeds to decision block 814. In an embodiment, if 5G channel management program 142 determines that the memory resources are over-allocated for the RLC UP stack ("yes" branch, decision block 810), then 5G channel management program 142 proceeds to step 812.

5G channel management program invokes the workload examiner (step 812). In an embodiment, if 5G channel management program 142 determines that the memory resources are over-allocated for the RLC UP stack, then 5G channel management program 142 uses the resource manager, e.g., the resource manager in RLC layer 540 of FIG. 5 above, to generate a trigger message. After generation of the trigger message, 5G channel management program 142 examines the information for the channels that can be merged that was gathered in step 804 above, invokes a workload examiner, and validates the RLC_IDs for appropriate workload for dynamic merger decisions.

5G channel management program 142 determines if any channels are below a threshold (decision block 814). In an embodiment, 5G channel management program 142 determines if any of the detected channels have workloads less than a threshold value. In an embodiment, the threshold value is a predetermined value. In another embodiment, the threshold value is a system policy. In an embodiment, the channels will have been selected for merger in step 808 above. In an embodiment, the channels will have a parameter of MERGE STATUS that indicates they are allowed to be merged.

In an embodiment, if 5G channel management program 142 determines that none of the detected channels have workloads less than the threshold value ("no" branch, decision block 814), then 5G channel management program 142 proceeds to step 818. In an embodiment, if 5G channel management program 142 determines that any of the detected channels have workloads less than the threshold value ("yes" branch, decision block 814), then 5G channel management program 142 proceeds to step 816.

5G channel management program creates a list of merger candidates (step 816). In an embodiment, if 5G channel management program 142 determines that any of the detected channels have workloads less than a threshold value, then 5G channel management program 142 transfers their identities to the merging unit that transparently handles packet flow routing for incoming I/O workloads. In an embodiment, 5G channel management program 142 sends the logical UUIDs of the RLC tunnels to be merged to the controller in the RLC, e.g., RLC layer 540 of FIG. 5. In an embodiment, once the RLC controller gets the logical UUIDs of the RLC tunnels to be merged, it creates a local table for the merge mapper data structures and selects the list of RLC_IDs created previously.

5G channel management program evaluates QCI categories and packet delay tolerance (step 818). In an embodiment, 5G channel management program 142 validates the QCI co-categories and packet transmission delay tolerance for all the candidate RLC_IDs in the list of merger candidates. In an embodiment, if QCI characteristics are different, then 5G channel management program 142 selects the channel RLC_ID with the higher QCI and sets that channel as the main.

5G channel management program writes records (step 820). In an embodiment, 5G channel management program 142 uses a multiplexer engine to keep track of main and auxiliary candidates for merging and real time packet forwarding is triggered on an auxiliary tunnel. In an embodiment, 5G channel management program 142 then returns to decision block 802.

Figure 9:
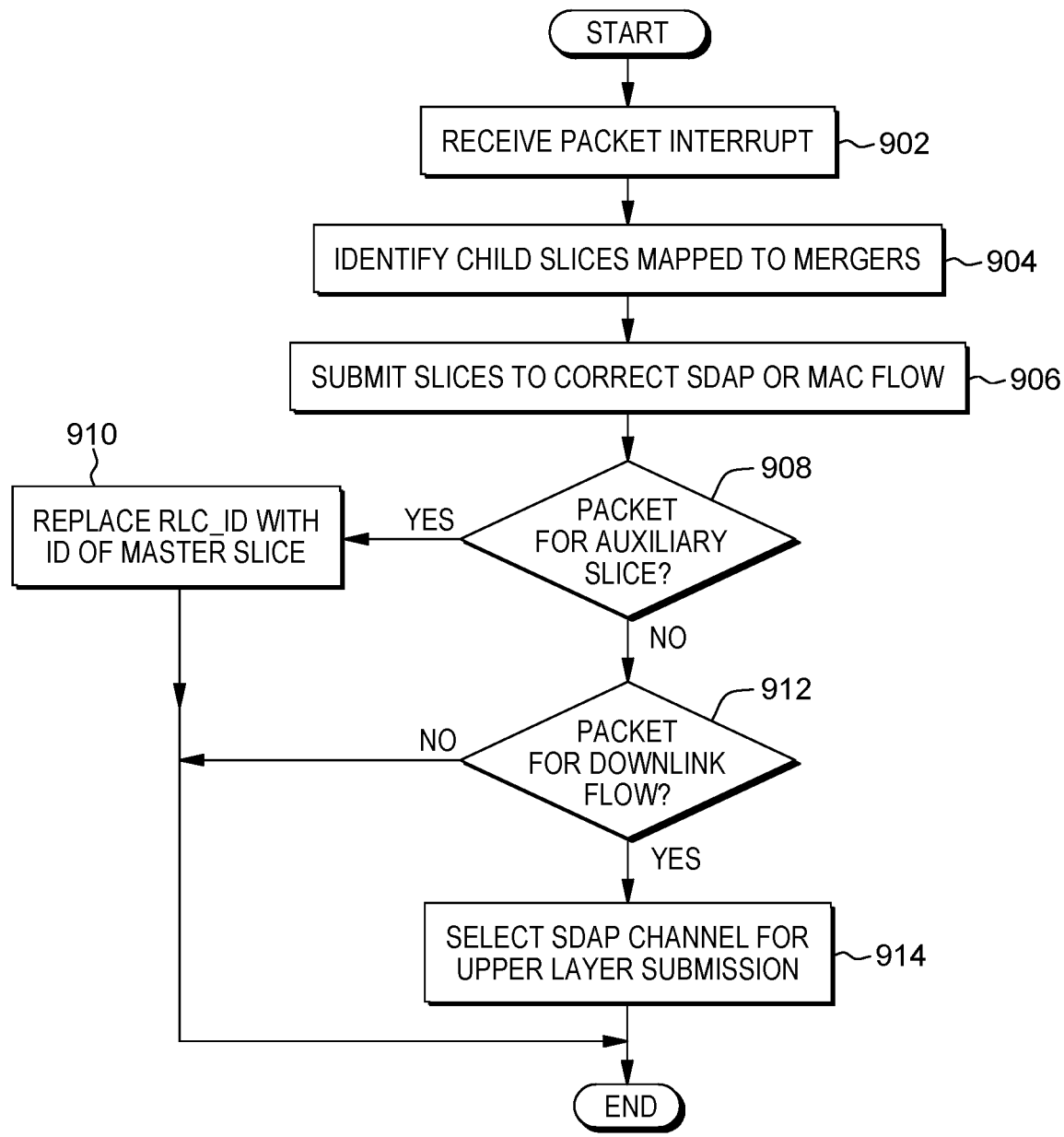
FIG. 9 is a flowchart depicting operational steps of the procedure performed by 5G channel management program 142 for serving packet flow from the Service Data Adaptation Protocol (SDAP) and the Medium Access Control (MAC) on a UE within the distributed data processing environment of FIG. 1, in accordance with an embodiment of the present invention.

FIG. 9 is a flowchart depicting operational steps of the procedure performed by 5G channel management program 142 for serving packet flow from the SDAP and the MAC on a UE within the distributed data processing environment of FIG. 1, in accordance with an embodiment of the present invention. In an alternative embodiment, the steps of workflow 900 may be performed by any other program while working with 5G channel management program 142.

In an embodiment, 5G channel management program 142 receives an interrupt indicating that a new packet has been received or a new packet is ready for transmission. In an embodiment, 5G channel management program 142 uses the RLC, e.g., RLC layer 540 from FIG. 5 above, to identify child slices mapped to the mergers. In an embodiment, 5G channel management program 142 invokes forwarding layers to submit the child slices to the appropriate SDAP or MAC flow. In an embodiment, if 5G channel management program 142 determines that the packet is targeted to an auxiliary slice, then 5G channel management program 142 overrides the RLC_ID of the main while framing the RLC header for the uplink packets. In an embodiment, 5G channel management program 142 then ends for this cycle. In an embodiment, 5G channel management program 142 determines if the packet is for a downlink flow. In an embodiment, if 5G channel management program 142 determines that the packet is targeted to a downlink flow, then 5G channel management program 142 extracts the RLC_ID and maps it with the SDAP ID. In an embodiment, 5G channel management program 142 then ends for this cycle.

It should be appreciated that embodiments of the present invention provide at least for operational steps of the procedure performed by 5G channel management program 142 for serving packet flow from SDAP and MAC on a UE within the distributed data processing environment of FIG. 1. However, FIG. 9 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 9 is illustrates one possible iteration of the procedure performed by 5G channel management program 142 for serving packet flow from SDAP and MAC on a UE within the distributed data processing environment of FIG. 1, which repeats each time a new packet I/O transmission or reception interrupt is received on the RLC protocol from the SDAP or the MAC on the UE.

5G channel management program 142 receives a packet interrupt (step 902). In an embodiment, 5G channel management program 142 receives an interrupt indicating that a new packet has been received or a new packet is ready for transmission.

5G channel management program 142 identifies a child slices mapped to mergers (step 904). In an embodiment, 5G channel management program 142 uses the RLC, e.g., RLC layer 540 from FIG. 5 above, to identify child slices mapped to the mergers. In an embodiment, if the slices are not mapped to mergers, then the usual transmission flows are mapped to the RLC_ID of the slices.

5G channel management program submit slices to correct SDAP or MAC flow (step 906). In an embodiment, 5G channel management program 142 invokes forwarding layers to submit the child slices to the appropriate SDAP or MAC flow. In an embodiment, while formulating the RLC header in the packets, 5G channel management program 142 invokes the appropriate SDAP identity in the packet and based on the SDAP identity selects the RLC_ID is selected for embedding the packet.

5G channel management program 142 determines if the packet is for an auxiliary slice (decision block 908). In an embodiment, if 5G channel management program 142 determines that the packet is not targeted to an auxiliary slice ("no" branch, decision block 908), then 5G channel management program 142 proceeds to decision block 912. In an embodiment, if 5G channel management program 142 determines that the packet is targeted to an auxiliary slice ("yes" branch, decision block 908), then 5G channel management program 142 proceeds to step 910.

5G channel management program replaces the RLC_ID with the ID of the main slice (step 910). In an embodiment, if 5G channel management program 142 determines that the packet is targeted to an auxiliary slice, then 5G channel management program 142 overrides the RLC_ID of the main while framing the RLC header for the uplink packets. In an embodiment, 5G channel management program 142 then ends for this cycle.

5G channel management program 142 determines if the packet is for a downlink flow (decision block 912). In an embodiment, if 5G channel management program 142 determines that the packet is not targeted to a downlink flow ("no" branch, decision block 912), then 5G channel management program 142 ends for this cycle. In an embodiment, if 5G channel management program 142 determines that the packet is targeted to a downlink flow ("yes" branch, decision block 912), then 5G channel management program 142 proceeds to step 914.

5G channel management program selects the SDAP channel for upper layer submission (step 914). In an embodiment, if 5G channel management program 142 determines that the packet is targeted to a downlink flow, then 5G channel management program 142 extracts the RLC_ID and maps it with the SDAP ID. In an embodiment, each layer maintains its own logical IDs for the respective channels and usually the mapping is one to one. In an embodiment, each RLC channel is mapped to single SDAP channel which is changed by 5G channel management program 142 in FIG. 8 above. In an embodiment, when any packet is submitted by the application layer, 5G channel management program 142 adds the IDs of the lower protocol layers so it gets decoded at the target correctly. In an embodiment, if the RLC_ID indicates that the flow is a main, then 5G channel management program 142 will select the SDAP channel based on upper layer submissions. In an embodiment, 5G channel management program 142 then ends for this cycle.

Figure 10:
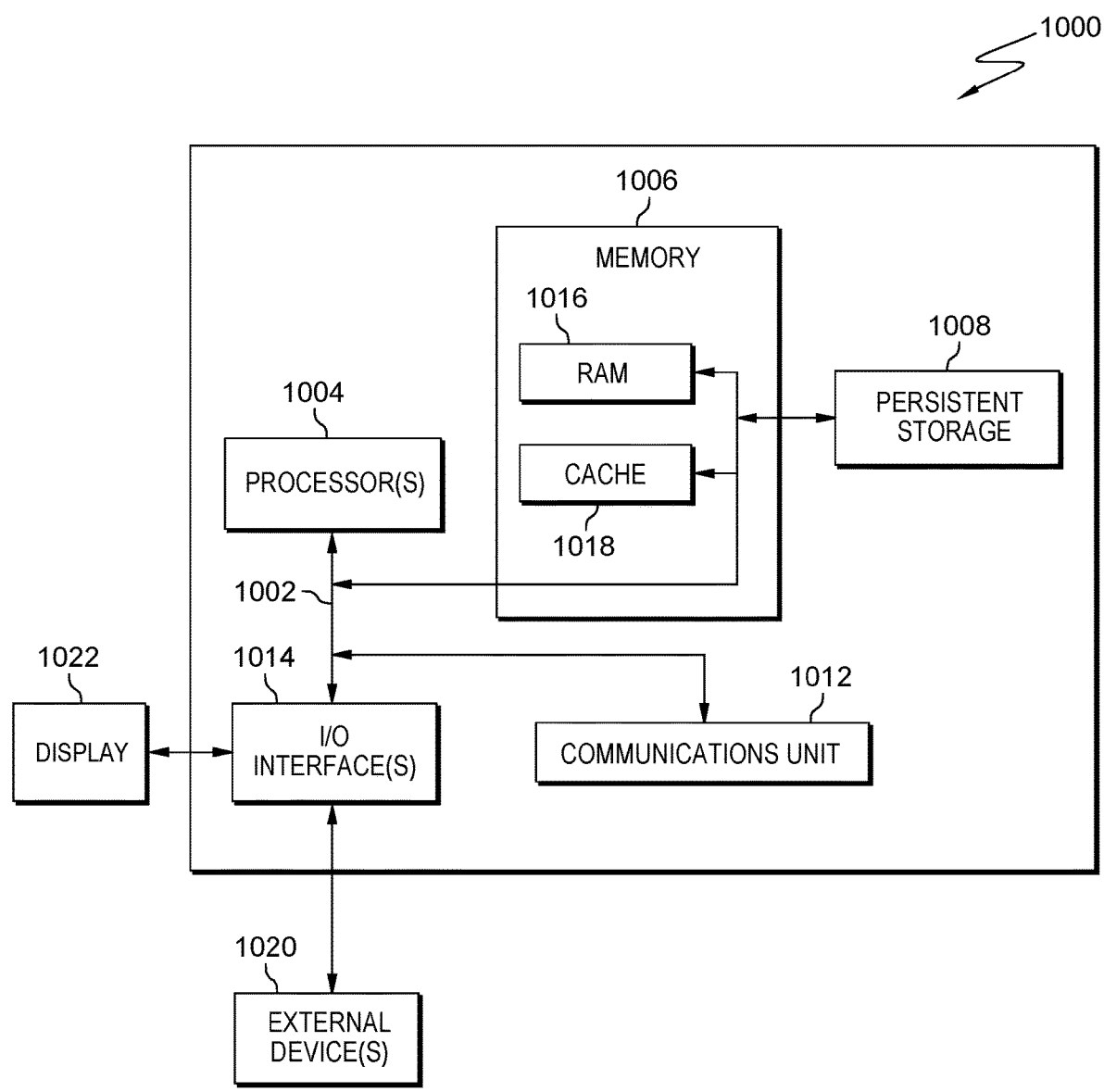
FIG. 10 depicts a block diagram of components of the computing device executing the 5G channel management program within the distributed data processing environment of FIG. 1, in accordance with an embodiment of the present invention.

FIG. 10 is a block diagram depicting components of computing device 110 suitable for 5G channel management program 142, in accordance with at least one embodiment of the invention. FIG. 10 displays computer 1000; one or more processor(s) 1004 (including one or more computer processors); communications fabric 1002; memory 1006, including random-access memory (RAM) 1016 and cache 1018; persistent storage 1008; communications unit 1012; I/O interfaces 1014; display 1022; and external devices 1020. It should be appreciated that FIG. 10 provides only an illustration of one embodiment and does not imply any limitations with regard to the environments in which different embodiments may be implemented. Many modifications to the depicted environment may be made.

As depicted, computer 1000 operates over communications fabric 1002, which provides communications between computer processor(s) 1004, memory 1006, persistent storage 1008, communications unit 1012, and I/O interface(s) 1014. Communications fabric 1002 may be implemented with any architecture suitable for passing data or control information between processors 1004 (e.g., microprocessors, communications processors, and network processors), memory 1006, external devices 1020, and any other hardware components within a system. For example, communications fabric 1002 may be implemented with one or more buses.

Memory 1006 and persistent storage 1008 are computer readable storage media. In the depicted embodiment, memory 1006 comprises RAM 1016 and cache 1018. In general, memory 1006 can include any suitable volatile or non-volatile computer readable storage media. Cache 1018 is a fast memory that enhances the performance of processor(s) 1004 by holding recently accessed data, and near recently accessed data, from RAM 1016.

Program instructions for 5G channel management program 142 may be stored in persistent storage 1008, or more generally, any computer readable storage media, for execution by one or more of the respective computer processors 1004 via one or more memories of memory 1006. Persistent storage 1008 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1012, in these examples, provides for communications with other data processing systems or devices. In these examples, communications unit 1012 includes one or more network interface cards. Communications unit 1012 may provide communications through the use of either or both physical and wireless communications links. In the context of some embodiments of the present invention, the source of the various input data may be physically remote to computer 1000 such that the input data may be received, and the output similarly transmitted via communications unit 1012.

I/O interface(s) 1014 allows for input and output of data with other devices that may be connected to computer 1000. For example, I/O interface(s) 1014 may provide a connection to external device(s) 1020 such as a keyboard, a keypad, a touch screen, a microphone, a digital camera, and/or some other suitable input device. External device(s) 1020 can also include portable computer readable storage media such as, for example, thumb drives, portable optical or magnetic disks, and memory cards. Software and data used to practice embodiments of the present invention, e.g., 5G channel management program 142, can be stored on such portable computer readable storage media and can be loaded onto persistent storage 1008 via I/O interface(s) 1014. I/O interface(s) 1014 also connect to display 1022.

Display 1022 provides a mechanism to display data to a user and may be, for example, a computer monitor. Display 1022 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to detecting a memory overload in an RLC layer of a 5G user equipment, determining, by one or more computer processors, whether one or more slices of a plurality of slices are one or more merger candidates;
determining, by the one or more computer processors, whether any merger candidates of the one or more merger candidates can share a transportation logical entity, wherein merger candidates can share the transportation logical entity if performance and quality parameters are within predetermined limits;
marking, by the one or more computer processors, the one or more merger candidates that can share the transportation logical entity as one or more allowed candidates; and
responsive to determining that at least one allowed candidate of the one or more allowed candidates have a workload that is below a predetermined threshold, merging, by the one or more computer processors, one or more allowed candidates into one or more merged flows.

2. The computer-implemented method of claim 1, wherein responsive to detecting the memory overload in the RLC layer of the 5G user equipment, determining if the one or more slices of the plurality of slices are the one or more merger candidates further comprises:
updating, by the one or more computer processors, a user plane protocol stack in the user equipment, wherein the user plane protocol stack is updated to include one or more additional functions for channel merger;
starting, by the one or more computer processors, a swapping manager for the RLC layer of the 5G user equipment, wherein the swapping manager polls an overall workload on each channel of a plurality of channels; and collecting, by the one or more computer processors, a merger status for each channel of the plurality of channels.

3. The computer-implemented method of claim 2, wherein the swapping manager continuously polls the overall workload on each channel of the plurality of channels.

4. The computer-implemented method of claim 2, wherein responsive to detecting the memory overload in the RLC layer of the 5G user equipment, determining if the one or more slices of the plurality of slices are the one or more merger candidates further comprises:

retrieving, by the one or more computer processors, one or more QoS Class Identifier (QCI) parameters and one or more bandwidth parameters for each allowed candidate of the one or more allowed candidates; and adding, by the one or more computer processors, each allowed candidate of the one or more allowed candidates to a list of merger candidates, wherein the list of merger candidates includes the one or more QCI parameters and the one or more bandwidth parameters.

5. The computer-implemented method of claim 4, wherein responsive to determining that the at least one allowed candidate of the one or more allowed candidates have the workload that is below the predetermined threshold, merging the one or more allowed candidates into the one or more merged flows comprises:

responsive to determining that the at least one allowed candidate of the one or more allowed candidates have the workload that is below the predetermined threshold, retrieving, by the one or more computer processors, the one or more QCI parameters and the one or more bandwidth parameters for each allowed candidate of the one or more allowed candidates;

validating, by the one or more computer processors, one or more QCI co-categories and a packet transmission delay tolerance for each allowed candidate;

selecting, by the one or more computer processors, one or more sets of allowed candidates, wherein each set of the one or more sets of allowed candidates can be merged into one merged flow of the one or more merged flows; and merging, by the one or more computer processors, each set of the one or more sets of allowed candidates into the one or more merged flows based on the one or more QCI co-categories and the packet transmission delay tolerance.

6. The computer-implemented method of claim 5, further comprising:

responsive to selecting the set of allowed candidates, determining, by the one or more computer processors, whether one or more allowed candidates of the set of allowed candidates has different QCI parameters than one or more other allowed candidates; and responsive to the one or more allowed candidates of the set of allowed candidates has the different QCI parameters than the other allowed candidates of the set of allowed candidates, assigning, by the one or more computer processors, a best allowed candidate as a main candidate and one or more remaining allowed candidates as one or more auxiliary candidates, wherein the best allowed candidate has a highest QCI parameters.

7. The computer-implemented method of claim 4, further comprising:

responsive to receiving a new packet I/O interrupt that is targeted to an auxiliary candidate, mapping, by the one or more computer processors, the new packet to the one or more merged flows.

8. A computer program product comprising one or more computer readable storage media and following program instructions stored on the one or more computer readable storage media, the program instructions including instructions to:

responsive to detecting a memory overload in an RLC layer of a 5G user equipment, determine whether one or more slices of a plurality of slices are one or more merger candidates;

determine whether any merger candidates of the one or more merger candidates can share a transportation logical entity, wherein merger candidates can share the transportation logical entity if performance and quality parameters are within predetermined limits;

mark the one or more merger candidates that can share the transportation logical entity as one or more allowed candidates; and responsive to determining that at least one allowed candidate of the one or more allowed candidates have a workload that is below a predetermined threshold, merge one or more allowed candidates into one or more merged flows.

9. The computer program product of claim 8, wherein responsive to detecting the memory overload in the RLC layer of the 5G user equipment, determine if the one or more slices of the plurality of slices are the one or more merger candidates further comprises the following program instructions stored on the one or more computer readable storage media, to:

update a user plane protocol stack in the user equipment, wherein the user plane protocol stack is updated to include one or more additional functions for channel merger;

start a swapping manager for the RLC layer of the 5G user equipment, wherein the swapping manager polls an overall workload on each channel of a plurality of channels; and collect a merger status for each channel of the plurality of channels.

10. The computer program product of claim 9, wherein the swapping manager continuously polls the overall workload on each channel of the plurality of channels.

11. The computer program product of claim 9, wherein responsive to detecting the memory overload in the RLC layer of the 5G user equipment, determine if the one or more slices of the plurality of slices are the one or more merger candidates further comprises the following program instructions stored on the one or more computer readable storage media, to:

retrieve one or more QoS Class Identifier (QCI) parameters and one or more bandwidth parameters for each allowed candidate of the one or more allowed candidates; and add each allowed candidate of the one or more allowed candidates to a list of merger candidates, wherein the list of merger candidates includes the one or more QCI parameters and the one or more bandwidth parameters.

12. The computer program product of claim 11, wherein responsive to determining that the at least one allowed candidate of the one or more allowed candidates have the workload that is below the predetermined threshold, merge the one or more allowed candidates into the one or more merged flows comprises the following program instructions stored on the one or more computer readable storage media, to:
- responsive to determining that the at least one allowed candidate of the one or more allowed candidates have the workload that is below the predetermined threshold, retrieve the one or more QCI parameters and the one or more bandwidth parameters for each allowed candidate of the one or more allowed candidates;
- validate one or more QCI co-categories and a packet transmission delay tolerance for each allowed candidate;
- select one or more sets of allowed candidates, wherein each set of the one or more sets of allowed candidates can be merged into one merged flow of the one or more merged flows; and
- merge each set of the one or more sets of allowed candidates into the one or more merged flows based on the one or more QCI co-categories and the packet transmission delay tolerance.

13. The computer program product of claim 12, further comprising the following program instructions stored on the one or more computer readable storage media, to:
- responsive to selecting the set of allowed candidates, determine whether one or more allowed candidates of the set of allowed candidates has different QCI parameters than one or more other allowed candidates; and
- responsive to the one or more allowed candidates of the set of allowed candidates has the different QCI parameters than the other allowed candidates of the set of allowed candidates, assign a best allowed candidate as a main candidate and one or more remaining allowed candidates as one or more auxiliary candidates, wherein the best allowed candidate has a highest QCI parameters.

14. The computer program product of claim 11, further comprising the following program instructions stored on the one or more computer readable storage media, to:
- responsive to receiving a new packet I/O interrupt that is targeted to an auxiliary candidate, map the new packet to the one or more merged flows.

15. A computer system comprising:
- one or more computer processors;
- one or more computer readable storage media; and
- program instructions stored on the one or more computer readable storage media for execution by at least one of the one or more computer processors, the stored program instructions including instructions to:
- responsive to detecting a memory overload in an RLC layer of a 5G user equipment, determine whether one or more slices of a plurality of slices are one or more merger candidates;
- determine whether any merger candidates of the one or more merger candidates can share a transportation logical entity, wherein merger candidates can share the transportation logical entity if performance and quality parameters are within predetermined limits;
- mark the one or more merger candidates that can share the transportation logical entity as one or more allowed candidates; and
- responsive to determining that at least one allowed candidate of the one or more allowed candidates have a workload that is below a predetermined threshold, merge one or more allowed candidates into one or more merged flows.

16. The computer system of claim 15, wherein responsive to detecting the memory overload in the RLC layer of the 5G user equipment, determine if the one or more slices of the plurality of slices are the one or more merger candidates further comprises following program instructions stored on the one or more computer readable storage media, to:
- update a user plane protocol stack in the user equipment, wherein the user plane protocol stack is updated to include one or more additional functions for channel merger;
- start a swapping manager for the RLC layer of the 5G user equipment, wherein the swapping manager polls an overall workload on each channel of a plurality of channels; and
- collect a merger status for each channel of the plurality of channels.

17. The computer system of claim 16, wherein the swapping manager continuously polls the overall workload on each channel of the plurality of channels.

18. The computer system of claim 16, wherein responsive to detecting the memory overload in the RLC layer of the 5G user equipment, determine if the one or more slices of the plurality of slices are the one or more merger candidates further comprises the following program instructions stored on the one or more computer readable storage media, to:
- retrieve one or more QoS Class Identifier (QCI) parameters and one or more bandwidth parameters for each allowed candidate of the one or more allowed candidates; and
- add each allowed candidate of the one or more allowed candidates to a list of merger candidates, wherein the list of merger candidates includes the one or more QCI parameters and the one or more bandwidth parameters.

19. The computer system of claim 18, wherein responsive to determining that the at least one allowed candidate of the one or more allowed candidates have the workload that is below the predetermined threshold, merge the one or more allowed candidates into the one or more merged flows comprises the following program instructions stored on the one or more computer readable storage media, to:
- responsive to determining that the at least one allowed candidate of the one or more allowed candidates have the workload that is below the predetermined threshold, retrieve the one or more QCI parameters and the one or more bandwidth parameters for each allowed candidate of the one or more allowed candidates;
- validate one or more QCI co-categories and a packet transmission delay tolerance for each allowed candidate;
- select one or more sets of allowed candidates, wherein each set of the one or more sets of allowed candidates can be merged into one merged flow of the one or more merged flows; and
- merge each set of the one or more sets of allowed candidates into the one or more merged flows based on the one or more QCI co-categories and the packet transmission delay tolerance.

20. The computer system of claim 18, further comprising the following program instructions stored on the one or more computer readable storage media, to:
- responsive to selecting the set of allowed candidates, determine whether one or more allowed candidates of the set of allowed candidates has different QCI parameters than one or more other allowed candidates; and
- responsive to the one or more allowed candidates of the set of allowed candidates has the different QCI parameters than the other allowed candidates of the set of allowed candidates, assign a best allowed candidate as a main candidate and one or more remaining allowed candidates as one or more auxiliary candidates, wherein the best allowed candidate has a highest QCI parameters.

* * * * *